Patented Sept. 14, 1943

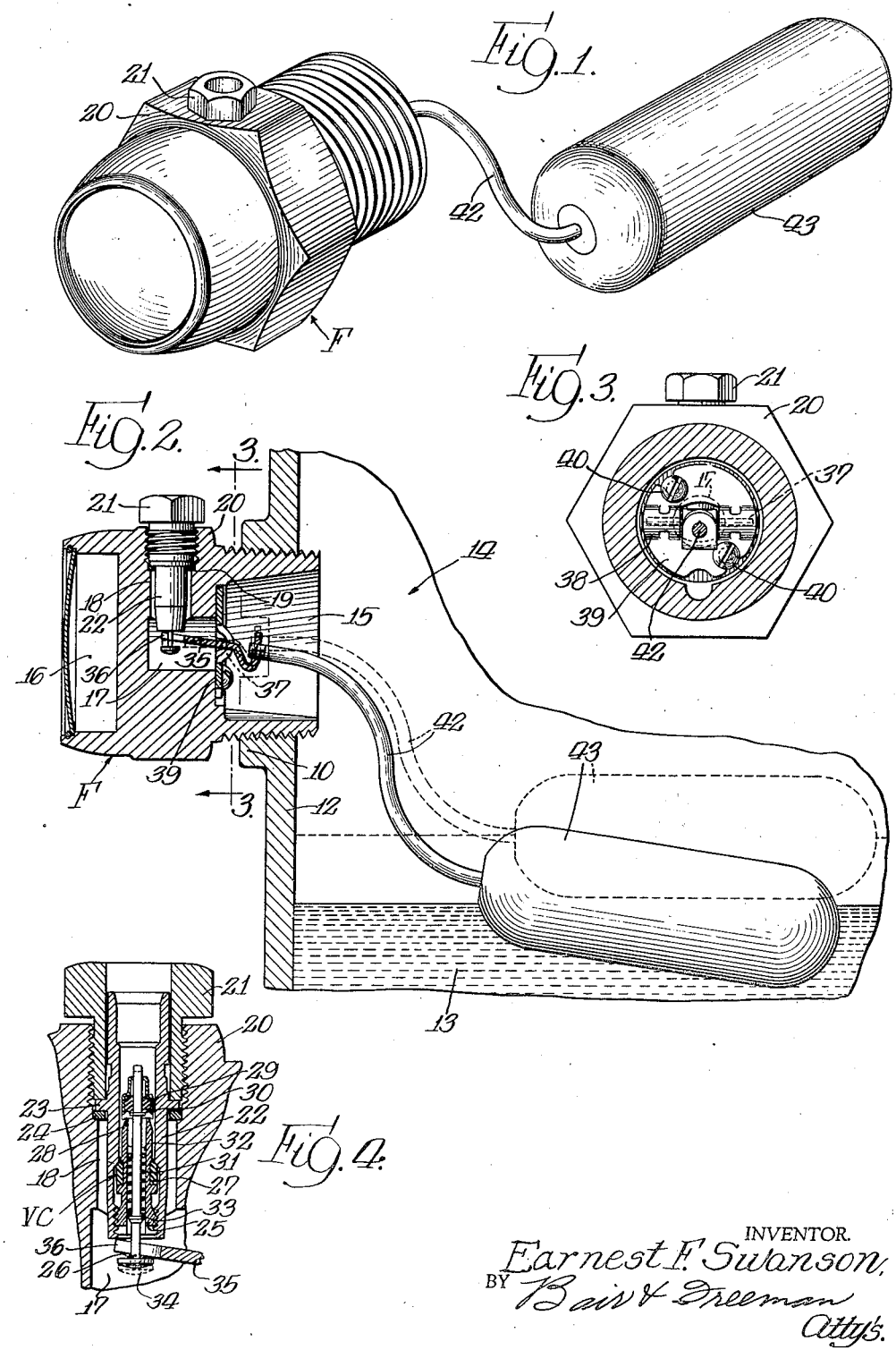

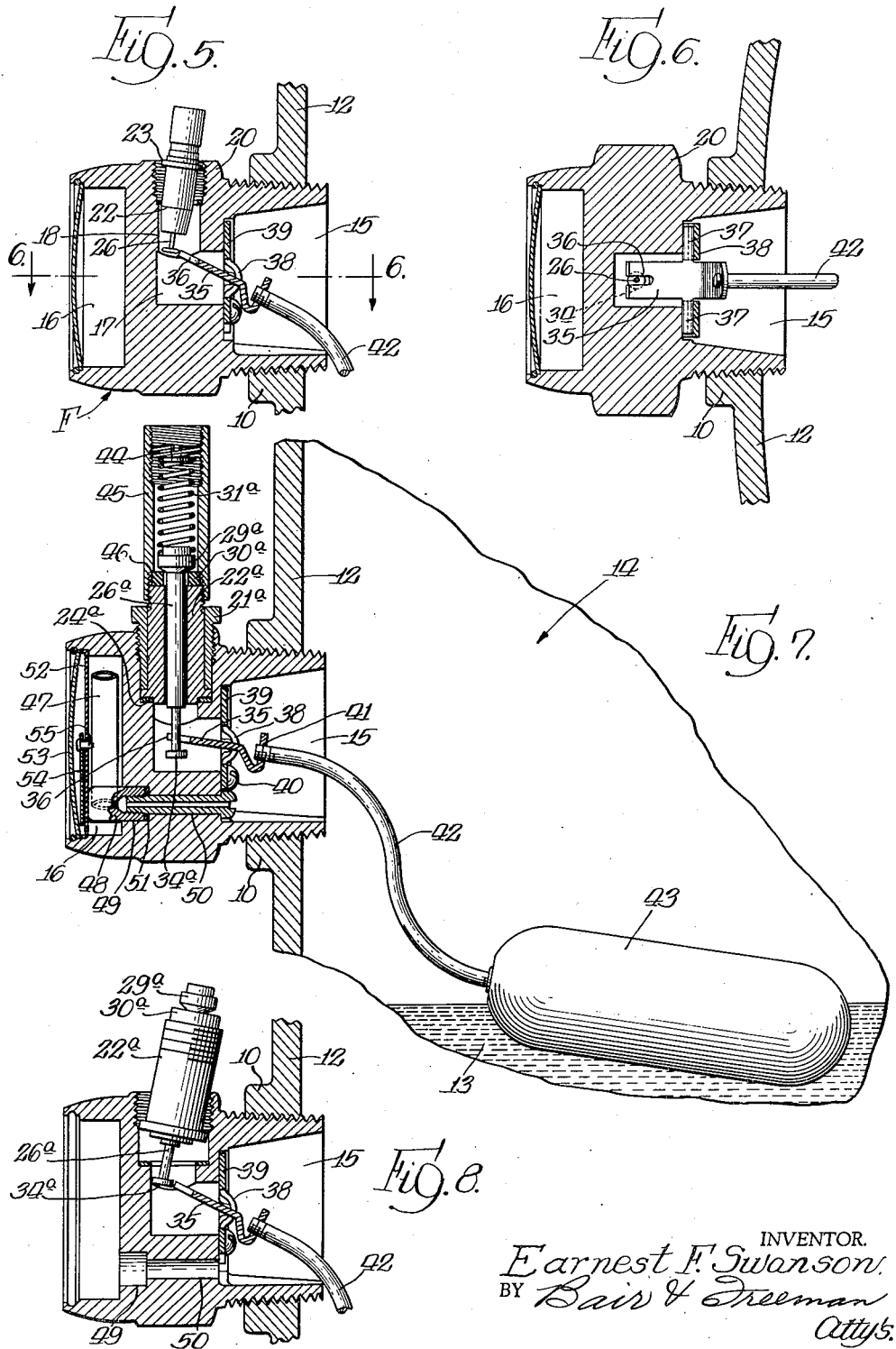

2,329,665

UNITED STATES PATENT OFFICE 2,329,665

AIR VOLUME CONTROL

Earnest F. Swanson, Goshen, Ind., assignor to Penn Electric Switch Co., Goshen, Ind., a corporation of Iowa Application December 27, 1940, Serial No. 371,924

12 Claims. (Cl. 137—68)

This invention relates to an air volume controlling device particularly adapted for deep well pumping systems or any hydropneumatic system wherein air is supplied with liquid to the tank to maintain a pneumatic head in the tank and it is necessary to relieve excess air accumulating in the tank.

One object of the invention is to provide an air volume controlling device in the form of a complete unit which can be mounted in the wall of a water storage tank adjacent the water level therein and which includes but a single valve responsive to both air pressure and water level within the tank.

Another object is to provide means to relieve air from the tank when the water level is low as a result of excess air in the pneumatic head of the tank, yet prevent such relief of air when the working pressure within the tank is lower than a predetermined amount.

A further object is to provide a simple and inexpensive unit in the form of a fitting which can be screwed into the wall of a tank and which includes a relief valve structure and a float so designed and associated with the relief valve that the float can be entered into the tank through the opening for the fitting and will control the relief valve so as to prevent its opening except when the water level is low as a result of excess air in the tank.

Still a further object is to provide the relief valve so mounted with respect to the fitting and the float operated means that it can be readily removed for renewing a valve core therein or for renewing a valve seat member of a modified form of the invention illustrated in my drawings wherein means is provided for adjusting the pressure at which the relief valve responds.

Other objects, purposes and characteristic features of the present invention will be in part obvious from the accompanying drawings and in part pointed out as the description of the invention progresses. In describing the invention in detail, reference will be made to the accompanying drawings in which like reference characters designate corresponding parts throughout the several views, and in which Figure 1 is a perspective view of an air volume controlling device embodying my invention;

Figure 2 is a vertical sectional view therethrough showing the device mounted in the wall of a hydropneumatic supply tank;

Figure 3 is a sectional view on the line 3—3 of Figure 2;

Figure 4 is an enlarged sectional view of a relief valve shown in side elevation in Figure 2;

Figure 5 is a sectional view similar to a portion of Figure 2 showing the installation or removal of a relief valve with respect to the main body or fitting of the control device;

Figure 6 is a sectional view on the line 6—6 of Figure 5;

Figure 7 is a view similar to Figure 2 showing a modified construction; and

Figure 8 is a view similar to Figure 5 showing the removal of the valve of Figure 7.

In the equipping of deep well water systems with an automatic air volume controlling means, several problems arise. First of all, it is undesirable to provide a control device of the kind shown in Penn Patent No. 1,674,341, of June 19, 1928, which permits the water pump to take in air whenever air is necessary to replenish the pneumatic head within the water supply tank. In a deep well pumping system the pump must be located within twenty five feet of the water in the well and cannot be mounted on the top of the ground. Therefore it is not feasible to run an air connection down to the pump. Instead it is desirable to have the pump take in air continuously while in operation and then bleed off the excess air from the water storage tank. In other systems, air is introduced into the tank by Venturi action, which would require bleeding off of excess air.

The operating pressure of a hydropneumatic pumping system varies, depending upon the setting of the automatic pressure responsive switch for controlling the pump motor. Usually the switch operates at a rather wide differential, for instance, on at 25 pounds' pressure and off at 45 pounds' pressure. Relief of air could be permitted in response to water level alone if it were not for the undesirable result of relief occurring at a time when the air pressure is low. From this standpoint, it is desirable to have a relief valve which would relieve air only when the presure is high. Heretofore, a float valve and a relief valve in series have accomplished the desirable result of relieving pressure only when the water level is low and when the air pressure is high. Obviously, such an arrangement necessitates two individual valves, and my present invention is the result of an attempt to simplify such an arrangement.

Specifically, my air volume controlling device includes a fitting F adapted to be screwed into a boss 10 of a water tank wall 12. The tank 12 is of the usual hydropneumatic type having water therein indicated at 13 and a pneumatic air head indicated at 14. The fitting F includes a body member having inner and outer cavities 15 and 16 and a central cavity 17 communicating with the cavity 15. Extending laterally and upwardly from the cavity 17 is a bore 18 having a shoulder at 19 and terminating in a threaded boss 20.

Threaded in the boss 20 is a sleeve nut 21 surrounding a sleevelike valve body 22. The body 22 is provided with an intermediate flange 23 adapted to seat against a gasket 24 resting on the shoulder 19.

Within the valve body 22, a valve core VC is mounted. The valve core VC is an ordinary tire valve core including a body portion 25 screwed into the lower end of the sleeve 22 and a stem 26 is slidable therein. A gasket 27 seals the members 22 and 25 relative to each other, and the member 25 has a valve seat 28. The stem 26 has a valve plug for seating thereagainst consisting of a cup 29 and a gasket or seating washer 30 therein. A spring 31 is interposed between a cross member 32 of the body member 25 and a collar 33 on the stem 26. The stem 26 is provided with a head 34 on its lower end.

Cooperating with the head 34 is a float lever or plate 35 forked at one end to provide a pair of fingers 36 which straddle the stem 26 and are adapted to contact with the upper surface of the head 34, as shown by dotted lines in Figure 2, when the level of the water 13 is high. The float lever 35 has a pair of laterally extending pintles 37 which are oscillatably mounted in a pair of indentations 38 of a pivot plate 39. The plate 39 is secured by screws 40 at the bottom of the cavity 15 in the fitting F. The end of the float arm 35 opposite the fingers 36 is threaded as at 41 to receive a float rod 42. A float 43 is mounted on the rod 42. The rod 42 is preferably curved to locate the float 43 well below the fitting F to prevent escape of water through the valve VC when it is opened.

The sleeve 21 is used as a means to retain the valve body 22 in position in such manner that it may be removed or installed. This operation is shown in Figure 5 wherein the sleeve nut 21 has been removed, and it will be noted that the valve body 22 may be tipped to cause the head 34 of the valve stem to clear the fingers 36 of the float arm, thereby permitting removal of the valve body 22. The valve core VC may then be renewed and the valve replaced. In performing these operations, the float rod 42 is preferably located at its lowest depending position by lowering the water level 13 so that the float 43 is out of the water.

In Figures 7 and 8, I show a modified construction wherein a valve body 22ª and a sleeve nut 21ª are substituted for similar elements 22 and 21 in Figure 4. A valve stem 26ª is provided having a valve head 29ª thereon seated against a gasket 30ª by a spring 31ª. The stem 26ª is provided with a head 34ª to coact with the fingers 36 of the float lever 35, as already described.

The spring 31ª is adjustable instead of being fixed as is the spring 31, and such adjustment is secured by a follower nut 44 screwed into a cap sleeve 45. The cap sleeve 45 has a shoulder 46 engaging the peripheral marginal edge of the gasket 30ª to seal it relative to the valve body 22ª. This modified form of valve is removed in a manner similar to the first described valve, as obvious from a comparison of Figure 8 with Figure 5. The sleeve cap 45 is first removed and then the sleeve nut 21ª may be removed.

My air volume controlling device is readily adaptable for inclusion of a pressure gauge such as illustrated in Figure 7. This gauge is of the usual Bourdon tube type, the tube being illustrated at 47 and having one end connected with a boss 48. The boss 48 enters a counterbore 49 at the bottom of the cavity 16 and is retained in position in the cavity by a screw 50. The screw 50 is hollow so as to communicate pressure from the cavity 15 to the boss 48, with leakage being prevented by a gasket 51.

The dial of the pressure gauge is indicated at 52 and the cover glass thereof at 53. The indicating needle is shown at 54 and is mounted on a spindle 55 which is operatively connected with the bourdon tube 47 in the usual manner, such as illustrated in the copending application of Burton E. Shaw, Serial No. 300,815, filed October 23, 1939.

The gauge as described is obviously well fitted for compact mounting within the fitting F without the necessity of having to provide a separate connection between the gauge and the tank 12.

Practical operation

The operation of both forms of my invention is similar. Referring to Figure 2, a relatively high water level as shown by dotted lines indicates that the proportion of air and water in the tank is normal. Accordingly, the buoyancy of the float causes it to exert through the fingers 36 a downward pressure on the head 34 of the relief valve to keep it closed. Thus even though a high air pressure, for instance, thirty or thirty-five pounds, will open the valve against the bias of its spring 31 when the float is down, the valve will be retained closed when the float is up, as the float in effect increases the loading of the valve. When the water level is low, however, as shown by solid lines, then the valve is free to be opened by air pressure when such pressure exceeds the setting of the spring 31. Therefore it takes the combination of a lower-than-normal water level and air pressure in the upper range of available pressures for the water tank 12 to open the relief valve and permit escape of excess air. When either the water level is high or the air pressure is low, there will be no escape. This is desirable from the standpoint of water level as it is only when the water level is low that the air should be permitted to escape. On the other hand, air should not be permitted to escape even though the water level is low, if the pressure within the tank happens to be in the lower part of its range, otherwise it will interfere with proper displacement of water from the tank by the pneumatic head when a faucet is opened.

My disclosed air volume controlling device obviously requires the use of but a single valve of relief type and a float so cooperating with it as to permit it to operate in its relief capacity only when the water level is lower than desired. Reversely, when the water level is lower than desired, relief of air is not permitted unless the air pressure within the tank exceeds a satisfactory operating value.

My invention has been described in the foregoing specification and illustrated in the drawings more or less precisely as to details. It is to be understood, however, that changes may be made in the arrangement and proportions of parts and equivalents may be substituted without departing from the spirit and scope of the invention as set forth in the appended claims.

What I claim as my invention and desire to secure by Letters Patent of the United States is:

1. In a deep well air volume controlling device, a fitting adapted for mounting in the wall of a hydropneumatic supply tank adjacent the water level line therein, a spring loaded relief valve carried by said fitting, opening outwardly relative thereto and set for relief of excess air therethrough against the bias of said spring upon such air attaining a predetermined pressure and acting directly against said relief valve, and float operated means mechanically connected with said relief valve so that the buoyancy of the float tends to hold the valve closed when the water in said tank is above a predetermined maximum level.

2. In an air volume controlling device, a fitting adapted for mounting in the wall of a hydropneumatic supply tank, a relief valve carried by said fitting and set for relief of excess air therethrough upon such air attaining a pressure within the upper range of pressures at which the system operates, said relief valve permitting escape of excess air upon the attainment of such pressure, and a float responsive to the level of liquid in said tank and engageable with said relief valve so that the buoyancy of the float tends to hold the valve seated when such level is above a predetermnied maximum.

3. In an air volume controlling device, a fitting adapted for mounting in the wall of a hydropneumatic supply tank adjacent the water level line therein, a relief valve carried by said fitting for permitting escape of excess air upon the attainment of a predetermined pressure, float operated means to engage said relief valve and thereby retain it closed when the water in said tank is above a predetermined maximum level, and a gauge mounted within said fitting, said fitting having a passageway from the interior thereof to said gauge to communicate the tank pressure to the gauge mechanism.

4. A deep well air volume controlling device comprising a fitting adapted to be mounted in the wall of a pneumatic water supply tank adjacent the water level therein, a valve carried by said fitting for connecting the interior of said tank to atmosphere, float operated means responsive to the level of the water to engage and positively retain said valve closed when the water exceeds a predetermined level, spring means to retain said valve closed except when the pressure of air within said tank exceeds a predetermined amount and said float is in lowered position to disengage said valve and thereby permit opening thereof, and gauge mechanism within said fitting and communicating through the fitting with the interior of the tank.

5. An air volume controlling device comprising a fitting adapted to be mounted in the wall of a pneumatic water supply tank receiving water and air, a valve carried by said fitting for connecting the interior of said tank above the water level therein to atmosphere, float operated means responsive to the level of the water, said float operated means having a portion to physically engage said valve to mechanically retain it closed when the water exceeds a predetermined level, spring means to retain said valve closed except when the pressure of air within said tank exceeds a predetermined amount and said float is in lowered position to thereby disengage said valve and permit opening thereof, and gauge mechanism communicating through said fitting with the interior of the tank.

6. An air volume controlling device comprising a fitting adapted to be mounted in the wall of a pneumatic water supply tank which receives water and air, a single valve carried by said fitting for permitting escape of air from said tank to atmosphere, float operated means responsive to the level of the water in the tank to engage said valve and tend to retain it closed due to the buoyancy of the float when the water exceeds a predetermined level, and means biasing said valve to remain closed except when the pressure of air within said tank exceeds a predetermined value.

7. Means for relieving excessive air from a water supply tank having a pneumatic head therein comprising a fitting, a relief valve mounted therein and float operated means to retain said valve closed at any water level exceeding a predetermined maximum, said valve opening outwardly and having a head for engagement by said float operated means, said valve including a sleevelike body, a sleeve nut surrounding said body and screwed into said fitting, said valve body being capable of being tipped to a position to disengage said head from said float operated means after said sleeve nut is removed.

8. Means for relieving excessive air from a water supply tank having a pneumatic head therein comprising a single valve, float operated means tending to retain said valve closed due to the buoyancy of the float at any water level exceeding a predetermined maximum and spring means to aid said float operated means in retaining said valve closed and to retain it closed independent of said float operated means when the float operated means responds to a water level less than said predetermined maximum except when air pressure in said tank overcomes the pressure of said spring means.

9. Means for relieving excessive air from a water supply tank having a pneumatic head therein comprising a fitting having a shouldered bore, a relief valve mounted therein, and float operated means to retain said valve closed at any water level exceeding a predetermined maximum, said valve having a head for engagement by said float operated means and including a sleevelike body, a sleeve nut surrounding said body and screwed into said fitting, said valve body having a flange to seat on said shoulder and being capable of being tipped to a position in said bore which permits disengagement of said head from said float operated means after said sleeve nut is removed.

10. In combination with a storage tank adapted to be supplied with air and water under pressure, a fitting adapted to be attached to a tank adjacent the normal water level therein, a relief valve carried by said fitting, said fitting having an opening to receive said relief valve, a sleeve nut surrounding said relief valve and coactible with a flange thereof to seat it against a shoulder in said fitting, a float arm pivoted to said fitting and engageable with the head of an outwardly opening valve stem in said relief valve, said sleeve nut upon removal permitting said relief valve to be tipped to a position permitting disengagement of said head from said float arm, a float on said arm and responsive to the water level in the tank, a cap sleeve on said relief valve, a relief spring mounted therein, a spring follower for said relief valve, said follower being adjustable relative to said sleeve cap to vary the relief pressure at which said relief valve responds, said float when responsive to a relatively high water level loading said relief valve to prevent opening thereof in response to air pressure.

11. A device for relieving air from a tank adapted to hold air and water under pressure when the tank requires relief of such air due to low water level therein comprising a valve body adapted to be attached to a tank adjacent the normal water level therein, a relief valve carried by said valve body, a float arm pivoted to said valve body and engageable with the top of a head of an outwardly opening valve stem in said relief valve, a float on said arm and responsive to the water level in the tank, a spring follower for said relief valve, said follower being adjustable to vary the relief pressure at which said valve responds, said float when responsive to a relatively high water level loading said relief valve due to the buoyancy of the float to thereby tend to hold the valve closed against opening thereof in response to air pressure.

12. In combination with a storage tank adapted to be supplied with air and water under pressure, a single valve carried by said tank, float operated means responsive to the level of the water in the tank to tend to retain said valve closed due to buoyancy of the float when the water exceeds a predetermined level, and spring means to retain said valve closed except when the pressure of air within said tank exceeds a predetermined amount and said float is in lowered position to permit opening of said valve and thereby escape of air from said tank.

EARNEST F. SWANSON.